(12) United States Patent
Marulkar et al.

(10) Patent No.: US 8,099,539 B2
(45) Date of Patent: Jan. 17, 2012

(54) METHOD AND SYSTEM OF A SHARED BUS ARCHITECTURE

(75) Inventors: Rajendra Sadanand Marulkar, Pune (IN); Gurvinder Pal Singh, Pune (IN)

(73) Assignee: LSI Corporation, Milpitas, CA (US)

( * ) Notice: Subject to any disclaimer, the term of this patent is extended or adjusted under 35 U.S.C. 154(b) by 982 days.

(21) Appl. No.: 12/045,036

(22) Filed: Mar. 10, 2008

(65) Prior Publication Data

US 2009/0228631 A1 Sep. 10, 2009

(51) Int. Cl.
  *G06F 13/36* (2006.01)
  *G06F 12/00* (2006.01)
  *G06F 13/00* (2006.01)

(52) U.S. Cl. .......... 710/309; 710/29; 710/117; 710/240; 710/241; 710/242; 710/243; 710/244; 711/100; 711/146; 711/147; 711/154; 711/167

(58) Field of Classification Search ............. 710/29, 710/117, 127, 240–244, 309; 711/100, 146, 711/147, 154, 167
See application file for complete search history.

(56) References Cited

U.S. PATENT DOCUMENTS

| | | | | |
|---|---|---|---|---|
| 6,263,399 B1* | 7/2001 | Hwang | | 711/103 |
| 6,505,305 B1* | 1/2003 | Olarig | | 714/5.11 |
| 7,013,368 B2* | 3/2006 | Takizawa | | 711/151 |
| 7,051,169 B2* | 5/2006 | Ganton | | 711/154 |
| 7,404,020 B2* | 7/2008 | Dropps et al. | | 710/71 |
| 7,631,245 B2* | 12/2009 | Lasser | | 714/768 |
| 7,730,268 B2* | 6/2010 | Maheshwari et al. | | 711/154 |
| 7,774,556 B2* | 8/2010 | Karamcheti et al. | | 711/146 |
| 7,793,059 B2* | 9/2010 | Cornwell et al. | | 711/157 |
| 7,818,527 B2* | 10/2010 | Kang | | 711/167 |
| 7,925,854 B2* | 4/2011 | Oh et al. | | 711/167 |
| 2008/0046638 A1* | 2/2008 | Maheshwari et al. | | 711/103 |
| 2008/0244156 A1* | 10/2008 | Patel | | 711/100 |
| 2009/0132736 A1* | 5/2009 | Hasan et al. | | 710/56 |
| 2009/0144509 A1* | 6/2009 | Wong et al. | | 711/147 |
| 2010/0161308 A1* | 6/2010 | Norman | | 703/23 |

OTHER PUBLICATIONS

Toshiba—"NAND vs. NOR Flash Memory"—4 pages; No Date provided.*
"Data Representation for Flash Memories" by Anxiao Jiang and Jehoshua Bruck—22 pages; No Date provided.*

* cited by examiner

*Primary Examiner* — Brian Misiura
(74) *Attorney, Agent, or Firm* — Raj Abhyanker, P.C.

(57) ABSTRACT

A method, system and apparatus of shared bus architecture are disclosed. In one embodiment, a method controlling set of multiplexers using an arbiter circuit per transaction, selecting one of a memory clock and a host clock based on an arbitration status, driving a final output on an interface to provide glitchless switching of an interface signal, connecting the interface signal to a tri-state buffer, and setting the direction of a data and address bus based on the connection of the interface signal to the tri-state buffer. The method may include applying a fair arbitration policy to ensure that none of the devices coupled to the interface signal and application threads running on processor requiring data from different devices are starved.

20 Claims, 9 Drawing Sheets

| SRAM RD BURST 502 (SLOT 1) | NAND ADDR PHASE 504 (SLOT 2) | HOST RD BURST 506 (SLOT 3) | SRAM 508 (SLOT 4) | NAND CMD PHASE 510 (SLOT 5) | HOST RD BURST 512 (SLOT 6) | NAND PAGE RD PART 1 514 (SLOT 7) | SRAM RD BURST 516 (SLOT 8) | NAND PAGE RD PART 2 518 (SLOT 9) |
|---|---|---|---|---|---|---|---|---|

EXPLANATION 520

NOTE: THE ABOVE FIGURE SHOWS THE SLOTS GIVEN TO EACH DEVICE FOR BUS OWNERSHIP. THE REQUESTS ARE ASSUMED TO COME HERE IN THE ORDER THEY ARE SERVICED. ~ 522

FIRMWARE, LOADING THE "RD COUNT" IN 2 SMALLER CHUNKS RATHER THAN COMPLETE PAGE READ, THE SRAM DEVICE IS ALLOWED TO GET ACCESS OF THE BUS IN BETWEEN TWO NAND PAGE READS. [NOTE THE ADDRESS/DATA BUSES ARE SHARED AMONG ALL DEVICES] ~ 524

THE TYPICAL CYCLE TIME FOR 1 BYTE READ IS 40ns FOR AN 8 BIT NAND DEVICE. THUS IN ORDER TO READ MAXIMUM 4K PAGE OF MLC DEVICE, IT WOULD HAVE STOPPED OTHER DEVICES TO GET THE ACCESS OF THE BUS FOR 40ns *4K = 160Kns. BY BREAKING THE NAND PAGE RD OPERATION, THIS UNFAIRNESS IS GREATLY REDUCED. ~ 526

SLOT VIEW 550

FIGURE 5

| HOST/FLASH OUTGOING SIGNALS TO PADS (INTERNAL MASTER OWNERSHIP) IN CASE OF EXTERNAL SLAVE OWNERSHIP "Fhp_pads_AddrData" DIRECTION SHALL BE REVERSED. [THERE ARE 4 CHIP SELECT PINS WHICH ARE NOT SHOWN BELOW] | | |
|---|---|---|
| Fhp_pads_AddrData [25:0] (MULTIPLEXED HP, AHB) | OUT<br><br>IN CASE OF NAND RD DATA PHASE, LOWER 8 BITS SHALL BE IN | NOR = 28 BIT ADDRESS BUS<br>NAND = BI-DIRECTIONAL MULTIPLEXED ADDRESS/DATA BUS FOR 8/16 BIT NAND. [LOWER BITS VALID FOR 8/16 BIT NAND]<br>HOST = BI-DIRECTIONAL MULTIPLEXED ADDR/DATA BUS |
| Fhp_pads_AddrData [40:26] (MULTIPLEXED HP, AHB) | OUT<br><br>IN CASE OF RD DATA PHASE, LOWER 16 BITS SHALL BE IN | NOR = BI-DIRECTIONAL 16 BIT DATA BUS<br>NAND = N/A<br>HOST = BI-DIRECTIONAL MULTIPLEXED ADDR/DATA BUS [31:26] BITS,<br>BITS [38:32] = CBE BUS [INCLUDES BYTE COUNT AND CMD [PIPELINED/NON PIPELINED]]<br>BITS [40:39] = CMD, READY |
| HP_CLK (CLOCK) | IN<br><br>OUT IN CASE OF MASTER MODE | HOST CONTROLLER CLOCK |
| Fhp_pad_req (INV_HP) | IN | NOR – N/A<br>NAND – N/A<br>HOST – BI-DIRECTIONAL BUS REQUEST<br>*STATIC |
| Fhp_pad_grant (HP) | OUT | NOR – N/A<br>NAND – N/A<br>HOST – BI-DIRECTIONAL BUS GRANT<br>*STATIC |
| Fhp_NAND_CLE (AHB) | OUT | NAND FLASH CLE SIGNAL |
| FHP_NAND_ALE (AHB) | OUT | NAND FLASH ALE SIGNAL |
| Fhp_WE (MULTIPLEXED HP,AHB) | OUT | NOR – WE<br>NAND – WE<br>HOST – N/A |
| Fhp_OEN (MULTIPLEXED HP,AHB) | OUT | NOR – OE<br>NAND – WE<br>HOST – N/A |

FIGURE 6

BUS PINOUT EXAMPLE TABLE 650

METHOD AND SYSTEM OF A SHARED BUS ARCHITECTURE

FIELD OF TECHNOLOGY

This disclosure relates generally to the technical fields of storage technology and, in one example embodiment to a method, system and apparatus of shared bus architecture.

BACKGROUND

Data may be communicated between different modules of a hardware system through a bus. The bus may be shared during communications between different modules. For example, the bus may be shared between an external host, a NAND, a NOR, a synchronous/asynchronous SRAM style interface (e.g., devices such as Wi-Fi). The shared pins may not provide a bandwidth required because of stalling (e.g., delays) during sharing of data across the bus. The shared pins may not be able to provide constant flow of data required for different application threads running on a processor requiring data from different external interfaces.

The bus may be formed with additional pins to minimize delays. The additional pins may increase costs of a device (e.g., a circuit) and may take up additional device area. As a result, a cost of the device may increase and the device may not operate when requirements require lower cost and smaller size (e.g., when a device is pin limited).

SUMMARY

A method, system and apparatus of shared bus architecture are disclosed. In one aspect, a method includes controlling a set of multiplexers using an arbiter circuit per transaction, selecting one of a memory clock and a host clock based on an arbitration status, driving a final output on an interface to provide glitchless switching of an interface signal, connecting the interface signal to a tri-state buffer, and setting the direction of a data and address bus based on the connection of the interface signal to the tri-state buffer.

The method may include applying a fair arbitration policy to ensure that none of the devices coupled to the interface signal and/or application threads running on processor requiring data from different devices are starved. The arbiter circuit per transaction may provide direct access to NOR device and/or SRAM from a System on a Chip (SoC). The arbiter circuit per transaction may provide direct host accesses to a memory mapped region of the SoC.

The NAND device accesses may be indirect accesses. If bus ownership is to be given on a command boundary level, it may be unfair for other application threads requiring other external devices because commands as an erase command, a page write command, a page read command and/or other commands of the NAND device take large amount of time. The arbitration may not be done at the command boundary of the NAND, but at any one intermediate phase of address, a command, a read data and/or write data.

The indirect accesses to NAND may be through the SoC which writes in NAND controllers counter registers which in turn results in Command Latch Enable (CLE) and Address Latch Enable (ALE) signal toggling on a NAND interface. A NAND Write Enable (WE) signal may be toggled along with write data as per a programmable write counter. The indirect access to NAND device may be through the SoC which reads data from the NAND device as per firmware that sets a read count and a read control in the control register (e.g., in which the Read Enable (RE#)signal on the NAND interface is toggled as per the "read counter" setting, thereby pulling data from the NAND device).

In addition, the method may include, breaking the NAND read number and the NAND write number into smaller counts when a NAND page size is larger than 2K per page for an 8 bit NAND to enable fair arbitration and ownership of the interface (e.g., an access time is approximately 40 nanoseconds for a byte read). A case of an external host accessing the SoC, an address/data may be input and/or the SoC accessing a NAND/NOR as the address/data are output, with an exception of NAND where address/data buses are multiplexed and in data phase (e.g., direction depends on a page read and/or a page write).

In another aspect, the method includes sharing a bus interface between memory modules and an external host (e.g., may be asynchronous while others are synchronous), interleaving between different types of accesses so as to enable fair access to the memory modules and the external host; providing direct access to NOR/SRAM from a System on a Chip (SoC) through an arbiter circuit per transaction; providing direct host accesses to a memory mapped region of the SoC through the arbiter circuit per transaction; and providing indirect access to a NAND through the SoC to prevent delay because of operations to and from the NAND.

The method may also include triggering a NAND/NOR interface signals at 150 MHz clock frequency through a finite state machine. The bus may be a bi-directional bus, and the modules and the external host may be used in both master and slave modes. The memory modules may include a NAND memory module, a NOR memory module, a synchronous SRAM memory module, and/or an asynchronous SRAM memory module. The method may further include interleaving data across a 32 bit host, a 64 MB NOR memory, a 8 bit NAND memory and a 16 bit NAND memory.

In yet another aspect, the system includes a set of memory modules including NAND memory module and other memory modules, a shared bus, and a system on a chip (SoC) to communicate with another module using the set of memory modules through the shared bus by applying a fair arbitration policy in which communication to and from the NAND memory is prioritized differently than communications between the system on the chip and the another module using the other memory modules. A NAND read number and a NAND write number may be broken into smaller counts when a NAND page is on an order of between 2 Kbytes or 4 Kbytes per page to enable fair arbitration and ownership of the shared bus.

An indirect access to NAND may be provided through the SoC which reads through a firmware that sets a read count and a read control. A NAND read signal may be toggled in every cycle (e.g., a NAND write signal is toggled along with a write data). Some of the other memory modules may be asynchronous while others are synchronous. A NAND/NOR interface signals may be triggered at 150 MHz clock frequency through a finite state machine, (e.g., the shared bus may be a bi-directional bus, and another module may be SoC and/or an external host). The SoC and another module may be used in both master and/or slave modes.

The methods, system, and apparatuses disclosed herein may be implemented in any means for achieving various aspects, and may be executed in a form of machine-readable medium embodying a set of instruction that, when executed by a machine, causes the machine to perform any of the operation disclosed herein. Other features will be apparent from the accompanying drawing and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 5 is a slot view showing the slots given to each device for bus ownership, according to one embodiment.

FIG. 6 is a bus Pinout example table, according to one embodiment.

Figure 1:
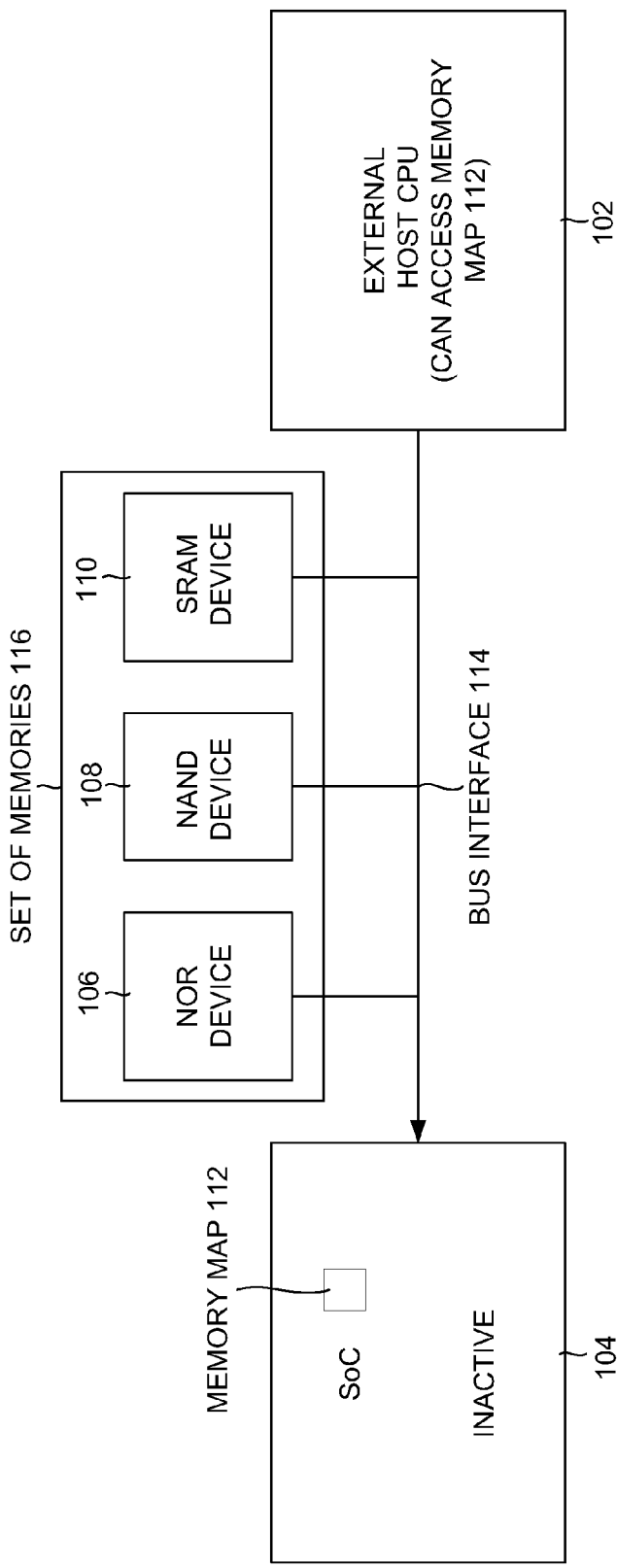
FIG. 1 illustrates an external host CPU accessing a System on a Chip (SoC) and a set of memories through a bus, according to one embodiment.

Other features of the present embodiments will be apparent from the accompanying drawings and from the detailed description that follows.

DETAILED DESCRIPTION

A method and system shared bus architecture are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes controlling a set of multiplexers (e.g., the set of multiplexers 414 of FIG. 4) using an arbiter circuit (e.g., the arbiter circuit 402 of FIG. 4) per transaction, selecting one of a memory clock (e.g., the memory clock 424 of FIG. 4) and a host clock (e.g., the host clock 428 of FIG. 4) based on an arbitration status, driving a final output on an interface to provide glitchless switching of an interface signal (e.g., the interface signal 422 of FIG. 4), connecting the interface signal 422 to a set of tri-state buffer (e.g., the set of tri-state buffer 416 of FIG. 4), and setting the direction of a data and address bus based on the connection of the interface signal 422 to the set of tri-state buffer 416.

In another embodiment, the method includes sharing a bus interface (e.g., Bus in 114 of FIG. 1) between memory modules and an external host, interleaving between different types of accesses (e.g., NOR device 106, NAND device 108, SRAM DEVICE 110 as illustrated in FIG. 1) so as to enable fair access to the memory modules and the external host, providing direct access to NOR/SRAM from a System on a Chip (SoC) (e.g., SoC 104 of FIG. 1) through an arbiter circuit (e.g., arbiter circuit 402 of FIG. 4) per transaction providing direct host accesses to a memory mapped region (e.g., the memory mapped region 418 of FIG. 4) of the SoC through the arbiter circuit 402 per transaction, and providing indirect access to a NAND device (e.g., the NAND device 108 of FIG. 1, FIG. 2, FIG. 3) through the SoC to prevent delay because of operations to and from the NAND device 108.

In yet another embodiment, a set of memory modules (e.g., the set of memory modules 116 of FIG. 1, FIG. 2 and FIG. 3) including a NAND memory module and other memory modules, a shared bus, and a System On a Chip (SoC) to communicate with another module using the set of memory modules (e.g., NOR device 106, NAND device 108, SRAM device 110 as illustrated in FIG. 1) through the shared bus by applying a fair arbitration policy in which communication to and from the NAND memory is prioritized differently than communications between the System On the Chip (SoC) and another module using the other memory modules.

FIG. 1 illustrates an external host CPU accessing a System on a Chip (SoC) and a set of memories through a bus, according to one embodiment. Particularly FIG. 1 illustrates an external host Central Processing Unit (CPU) 102, SoC 104, NOR device 106, NAND device 108, SRAM device 110, memory map 112 and Bus interface 114, and a set of memories 116, according to one embodiment.

The Central processing unit (CPU) 102 may be a part of a computer that interprets instructions and executes the computer programs. The System on Chip (SoC) 104 may contain digital, analog, mixed-signal, and/or radio-frequency functions (e.g., on a chip). The NOR device 106 may be non-volatile computer memory that can be electrically erased and/or reprogrammed. The NAND device 108 memories may be accessed much like block devices such as hard disks and/or memory cards. The Static random access memory (SRAM) device 110 may be a type of semiconductor memory (e.g., Asynchronous and synchronous SRAM). The memory map 112 may be a mapping of a memory region in the NOR device 106, the NAND device 108, and/or the SRAM 110. The bus interface 114 may be a subsystem that transfers data between computer components inside a computer and/or between computers (e.g., Future Bus, InfiniBand etc.). The set of memories 116 may include NOR device 106, the NAND device 108, and the SRAM device 110.

In an example embodiment, the data from the external host CPU 102 may be transferred to the internal memory map 112 through the bus interface 114. The bus interface may provide indirect access to NOR device 106 NAND device 108 and SRAM device 110 to SoC 104. The set of memories 116 may include the NOR device 106, the NAND device 108, and SRAM device 110.

In one embodiment, the indirect access to a NAND device 108 through the SoC 104 may be provided to prevent delay because of operations to and from the NAND device 108. The SoC 104 and another module may be used in both master and slave modes. The NAND/NOR interface signals may be triggered at 150 MHz clock frequency through a finite state machine. The set of memory modules 116 and the external host 102 may be asynchronous while others may be synchronous.

The NAND device 108 accesses may be indirect accesses because if bus ownership is to be given on a command boundary level, it may be unfair to other application threads requiring other external devices because an erase command, a page write command, a page read command, and other commands of the NAND device 108 may take large amounts of time. Arbitration may not be done at the command boundary of the NAND device 108, but at any intermediate phase of an address, a command, a read data, and/or a write data.

The indirect access to the NAND device 108 may be through the SoC 104 which writes in NAND controllers counter registers which in turn results in Command Latch Enable (CLE) and Address Latch Enable (ALE) signals toggling on a NAND interface. A NAND Write Enable (WE) signal may be toggled along with write data as per a programmable write counter. The indirect access to the NAND device 108 may be through the SoC 104 which reads data from the NAND device 108 as per a firmware that sets a read count and a read control in a control register. A NAND Read Enable (RE#) signal on a NAND interface may be toggled as per a read counter setting thereby pulling data from the NAND device 108.

The NAND read number and/or the NAND write number may be broken into smaller counts when a NAND page size is larger than 2K per page for an 8 bit NAND to enable fair arbitration and ownership of the interface. An access time may be approximately 40 nanoseconds for a byte read. The case of an external host 102 accessing the SoC 104, an address/data may be the inputs and the SoC 104 accessing a NAND device 108 and a NOR device 106 as the address/data may be the output, with an exception of the NAND device 108 where address/data buses may be multiplexed and in data phase, direction depends on the page read and the page write.

The bus interface 114 may be shared between a set of memory modules 116 and/or an external host 102, interleaving between different types of accesses so as to enable fair access to the memory modules and the external host 102. The set of memory modules 116 may include a NAND memory module (e.g., the NAND device 108) and other memory modules (e.g., the NOR device 106 and/or the SRAM device 110).

The shared bus may be the bus interface 114. A system on a chip (e.g., the SoC 104) may communicate with another module (e.g., the SoC 102) using the set of memory modules 116 through the shared bus (e.g., the bus interface 114 and/or 314) by applying a fair arbitration policy in which communication to and from the NAND memory (e.g., the NAND device 108) may be prioritized differently than communications between the System On the Chip (e.g., the SoC 104) and the another module (e.g., the SoC 102) using the other memory modules (e.g., the NOR device 106 and the SRAM device 110, etc.).

The NAND read number and a NAND write number may be broken into smaller counts when a NAND page size may be on an order of between 2 kilobytes and/or 4 kilobytes per page, to enable fair arbitration and ownership of the shared bus (e.g., the bus interface 114).The indirect access to NAND device 108 may be provided through the SoC 104 which reads through a firmware that sets a read count and a read control. A NAND read signal may be toggled in every cycle, and a NAND write signal may be toggled along with a write data. The other memory modules (e.g., NOR device 106, SRAM device 110) may be asynchronous while others may be synchronous.

Figure 2:
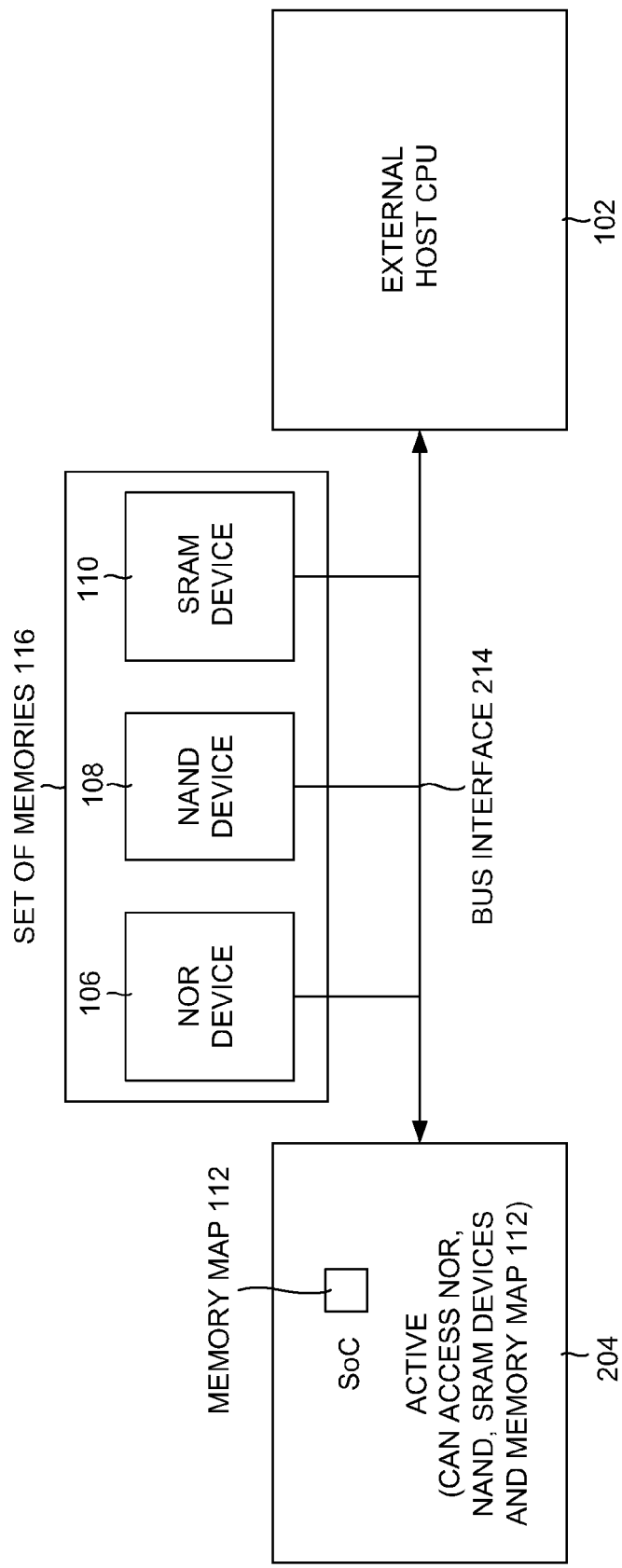
FIG. 2 illustrates communication between a System on a Chip (SoC), the external host CPU and the set of memories through a bus, according to one embodiment.

The memory modules (e.g., the set of memories 116) may include a NAND device 106, a NOR device 108, a SRAM device 110 (e.g., an asynchronous SRAM memory module). Data across a 32 bit host, a 64 MB NOR memory, a 8 bit NAND memory, and a 16 bit NAND memory may be interleaved FIG. 2 illustrates communication between a System on a Chip (SoC), the external host CPU and the set of memories through a bus, according to one embodiment. Particularly FIG. 2 illustrates, an external host CPU 102, SoC 204, a Bus 214, a NOR device 106, a NAND device 108, SRAM device 110 and memory map 112 according to one embodiment.

The System on Chip (SoC) 204 may contain digital, analog, mixed-signal, and radio-frequency functions all on one chip. The bus interface 214 may be a subsystem that transfers data between computer components inside a computer or between computers (e.g., Future Bus, InfiniBand etc.). In an example embodiment, the data may be moved between an internal SoC 204 and an external host CPU 102 through the bus interface 214 and/or communicated to the other memory modules such as NOR device 206, NAND device 208 and/or SRAM device 210.

In one embodiment, communication between a System on a Chip (SoC), the external host CPU and the set of memories may be facilitated through a bus (e.g., the bus interface 214). The bus interfaces 214 may be a bi-directional bus. The SOC 204 and the external host 102 may be used in both master and slave modes. The shared bus (e.g., the bus interface 214) may be a bi-directional bus.

Figure 3:
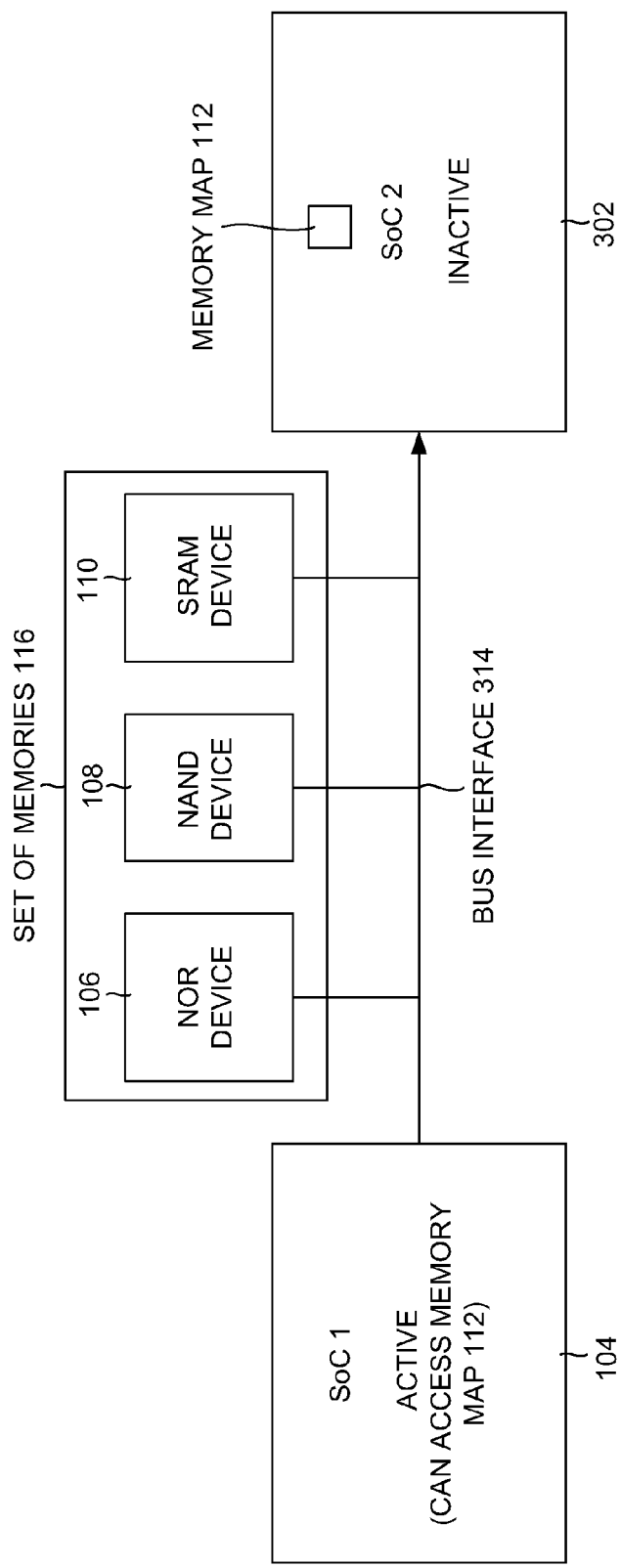
FIG. 3 illustrates System on a Chip (SoC1) accessing another System on a Chip (SOC2) and the set of memories through a bus, according to one embodiment.

FIG. 3 illustrates System on a Chip (SoC 1) accessing another System on a Chip (SOC2) and the set of memories through a bus, according to one embodiment. Particularly FIG. 3 illustrates, a Soc 2 302, an SoC 1 104, NOR device 106, a NAND device 108, SRAM 110 and memory map 112, and bus interface 314 according to one embodiment.

In the example embodiment illustrated in FIG. 3, the data may be accessed from SoC 2 302 to SoC 1 104 through the bus interface 314 and may be communicated to the other modules such as NOR device 306, NAND device 308 and SRAM 310. FIG. 3 illustrates System on a Chip (SoC 1) accessing another System on a Chip (SoC 2) and the set of memories through a bus, according to one embodiment.

Figure 4:
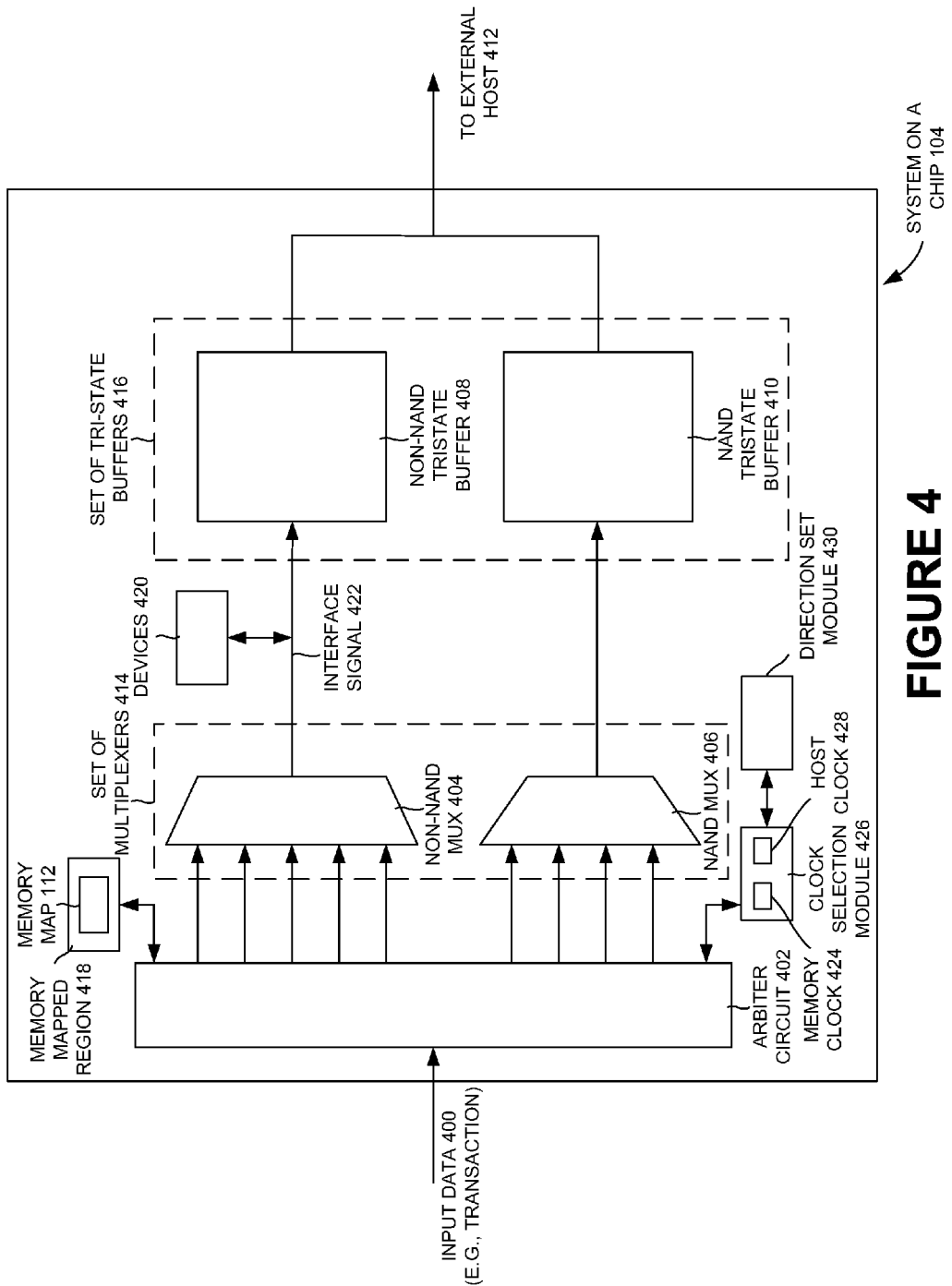
FIG. 4 is an exploded view of the System on Chip (SoC) illustrated in FIG. 1 having an arbiter circuit and a set of tri-state buffers, according to one embodiment.

FIG. 4 is an exploded view of the System on Chip (SoC) illustrated in FIG. 1 having an arbiter circuit and a set of tri-state buffers, according to one embodiment. Particularly FIG. 4 illustrates an input data 400, arbiter circuit 402, NON-NAND MUX 404, NAND MUX 406, NON-NAND tri-state buffer 408, NAND tri-state buffer 410, an to external host signal 412, a set of multiplexer 414, a set of tri-state buffer 416, a memory mapped region 418, devices 420, an interface signal 422, memory clock 424, clock selection module 426, host clock 428, direction set module 430 and SoC 104, according to one embodiment.

The input data 400 may be from another SoC. The arbiter circuit 402 may be electronic device that allocates access to shared resources. The NON-NAND MUX 404 and NAND MUX 406 may be the constructs of hardware design. The NON-NAND tri-state buffer 408 and the NAND tristate 410 buffer may be a switch used to implement efficient multiplexers, especially those with large numbers of inputs. The to external host on NAND signal 412 may be an output signal from the Signal On Chip SoC 104. The set of multiplexer 414 may be a device that performs multiplexing. The set of tri-state buffer 416 may be a device that allows output ports to have a value of 0, 1, or a high impedance state. The outputs from the tri-state buffer 416 may be a signal to external host 412. The memory mapped region 418 may be a region inside the memory(e.g., may contain necessary information regarding the size of total memory, and may also provide other details).

The devices 420 may be connected to the interface signal 422. The interface signal 422 may be an output signal from the set of multiplexers 414 to the set of tri-state buffer 416. The memory clock 424 may be the clock used on the communication between the processing unit 102 and the System On Chip (SoC) 104. The clock selection module 426 may allow the System On Chip (SoC) 104 to choose between the memory clock 424 or the host clock 428 (e.g., for faster communication). The host clock 428 may be memory clock of the external host CPU device 102. The direction set module 430 may set the direction of a data and address bus based on the connection of the interface signal 422 to the set of tri-state buffers 416 and SoC.

In example embodiment, the input data 400 may be an incoming data to the arbiter circuit 402 which produces several signals to the set of multiplexers 414 (e.g., which may include the non-NAND MUX 404 and the NAND MUX 406), to the memory mapped region 418, and to the clock selection module 426. The interface signal 422 may be the output signal from the set of multiplexers 414 to the set of tri-state buffer 416. The output from the set of tri-state buffers 416 may be sent to external host on NAND 412. The direction set module 430 may be connected to the clock selection module 426.

In one embodiment, the set of multiplexers 414 may be controlled using an arbiter circuit 402 per transaction. The memory clock 426 and/or a host clock 430 may be selected based on an arbitration status. A final output on an interface may be driven to provide glitchless switching of an interface signal 422. The interface signal 422 may connect to a tri-state buffer (e.g., a non-NAND tri-state buffer 408 and/or a NAND tri-state buffer 410) and the direction of a data and address bus may be set based on the connection of the interface signal 422 to the set of tri-state buffer 416 (e.g., a Non-NAND tri-state buffer 408 and/or a NAND tri-state buffer 410).

The fair arbitration policy may be applied to ensure that none of the devices coupled to the interface signal 422 and/or application threads running on processor requiring data from different devices (e.g., devices 420) are starved. The arbiter circuit 402 per transaction may provide direct access to a NOR device 106 and a SRAM device 110 from a System on a Chip (SoC) 104. The direct access to NOR/SRAM from a System on a Chip (SoC) 104 through the arbiter circuit 402 per transaction may be provided. The direct host accesses to a memory mapped region 418 of the SoC 104 through the arbiter circuit 402 per transaction may be provided and a NAND/NOR interface signals at 150 MHz clock frequency may be triggered through a finite state machine.

FIG. 5 is a slot view showing the slots given to each device for bus ownership, according to one embodiment. Particularly FIG. 5 illustrates, a slot view 550, a SRAM RD burst slot 502, a NAND ADDR PHASE slot 504, a HOST RD burst slot 506, a NAND CMD PHASE slot 510, a HOST RD burst slot 512, a NAND PAGE RD slot 514, a SRAM burst slot 516, NAND PAGE RD slot 518, explanation block 520, note block 522, an explanation block 524, and an explanation block 526, according to one embodiment.

In FIG. 5 slot 1 is illustrated as SRAM RD BURST 502 slot, slot 2 is illustrated as the NAND ADDR PHASE 504 slot, slot 3 is illustrated as the HOST RD BURST 506 slot, slot 4 is illustrated as the SRAM 508 slot, slot 5 is illustrated as the NAND CMD PHASE 510 slot, slot 6 is illustrated as the HOST RD BURST 512 slot, slot 7 is illustrated as the NAND PAGE RD PART 1 514 slot, slot 8 is illustrated as the SRAM RD BURST 516 slot, slot 9 is illustrated as the NAND PAGE RD PART 2 518 slot. The explanation 520 block may explain the slots given to each device for bus owner ship. The note block 522 gives a note stating that the slots of FIG. 5 are given to each device for bus ownership (example.g., the requests may be assumed to come in the slots in the order that they are serviced).

The explanation block 524, states that, in firmware, loading the "RD COUNT" is done in two smaller chunks rather than complete PAGE READ (e.g., PAGE RD PART 1 of slot 514 and PAGE RD PART 2 of slot 518), the SRAM device 110 may be allowed to get access of the bus (e.g., the bus interface 114, 214 and 314 of FIG. 1, FIG. 2 and FIG. 3 respectively) in between two NAND PAGE READS (e.g., PAGE RD PART 1 of slot 514 and PAGE RD PART 2 of slot 518). The address/data buses may be shared among all devices. The explanation block 526 states that the typical cycle time for 1 byte READ is 40 ns for an 8 bit NAND device 108, in order to read maximum 4K PAGE, NAND device 108 may have stopped other devices to get the access of the bus for 40 ns*4K=160 Kns, so in order to reduce unfairness of holding the bus by a NAND device for a long period of 160 Kns the NAND PAGE RD operation (e.g., PAGE RD PART 1 of slot 514 and PAGE RD PART 2 of slot 518) is broken.

FIG. 6 is a bus pinout example table 650, according to one embodiment. Particularly FIG. 6 illustrates, a bus Pinout example table 650 including the states and configurations for bus pinouts, according to one embodiment.

In FIG. 6, one example of pinout is illustrated for a particular embodiment. This particular embodiment illustrates HOST/FLASH outgoing signals to pads (e.g., internal master ownership) in case of external slave ownership. The bus pinout example table 650 shows various configurations including FHP_PADS_AddrData [25:0] configuration, FHP_PADS_AddrData[40:26] configuration, HP_CLK (CLOCK) configuration, FHP_PAD_REQ (INV_HP) configuration, FHP_PAD_GRAND (HP) configuration, FHP_NAND_CLE (AHB) configuration, FHP_NAND_ALE (AHB) configuration, FHP_WE (multiplexed HP, AHB) configuration, FHP_OEN (multiplexed HP, AHB) configuration. In other embodiments the pinout structure may be different.

Figure 7:
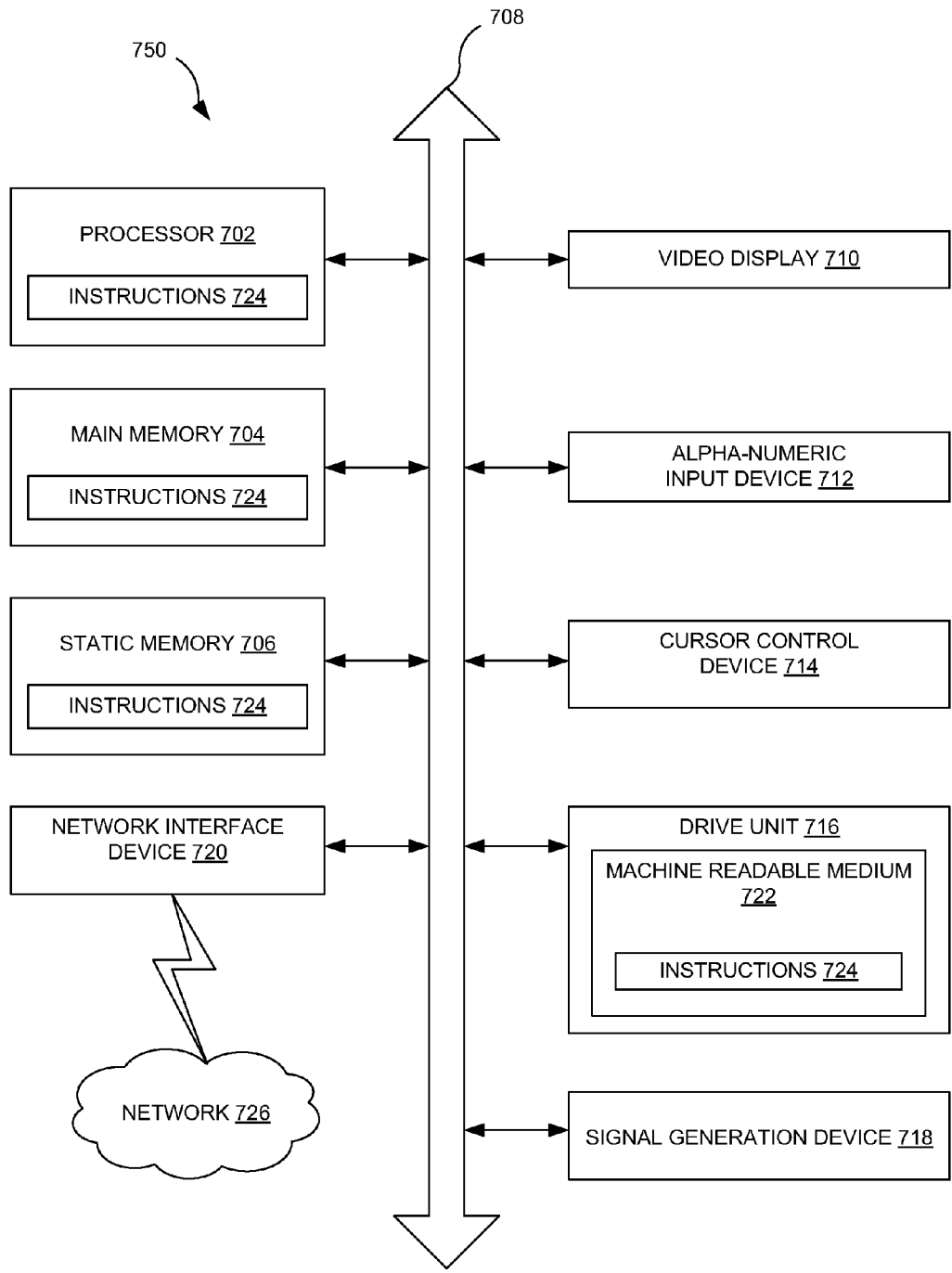
FIG. 7 is a diagrammatic system view of a data processing system in which any of the embodiments disclosed herein may be performed, according to one embodiment.

FIG. 7 is a diagrammatic system view 700 of a data processing system in which any of the embodiments disclosed herein may be performed, according to one embodiment. Particularly, the diagrammatic system view 700 of FIG. 7 illustrates a processor 702, a main memory 704, a static memory 706, a bus 708, a video display 710, an alpha-numeric input device 712, a cursor control device 714, a drive unit 716, a signal generation device 718, a network interface device 720, a machine readable medium 722, instructions 724, and a network 726, according to one embodiment.

The diagrammatic system view 700 may indicate a personal computer and/or the data processing system in which one or more operations disclosed herein are performed. The processor 702 may be a microprocessor, a state machine, an application specific integrated circuit, a field programmable gate array, etc. (e.g., Intel® Pentium® processor). The main memory 704 may be a dynamic random access memory and/or a primary memory of a computer system.

The static memory 706 may be a hard drive, a flash drive, and/or other memory information associated with the data processing system. The bus 708 may be an interconnection between various circuits and/or structures of the data processing system. The video display 710 may provide graphical representation of information on the data processing system. The alpha-numeric input device 712 may be a keypad, a keyboard and/or any other input device of text (e.g., a special device to aid the physically handicapped).

The cursor control device 714 may be a pointing device such as a mouse. The drive unit 716 may be the hard drive, a storage system, and/or other longer term storage subsystem. The signal generation device 718 may be a bios and/or a functional operating system of the data processing system. The network interface device 720 may be a device that performs interface functions such as code conversion, protocol conversion and/or buffering required for communication to and from the network 726. The machine readable medium 722 may provide instructions on which any of the methods disclosed herein may be performed. The instructions 724 may provide source code and/or data code to the processor 702 to enable any one or more operations disclosed herein.

Figure 8:
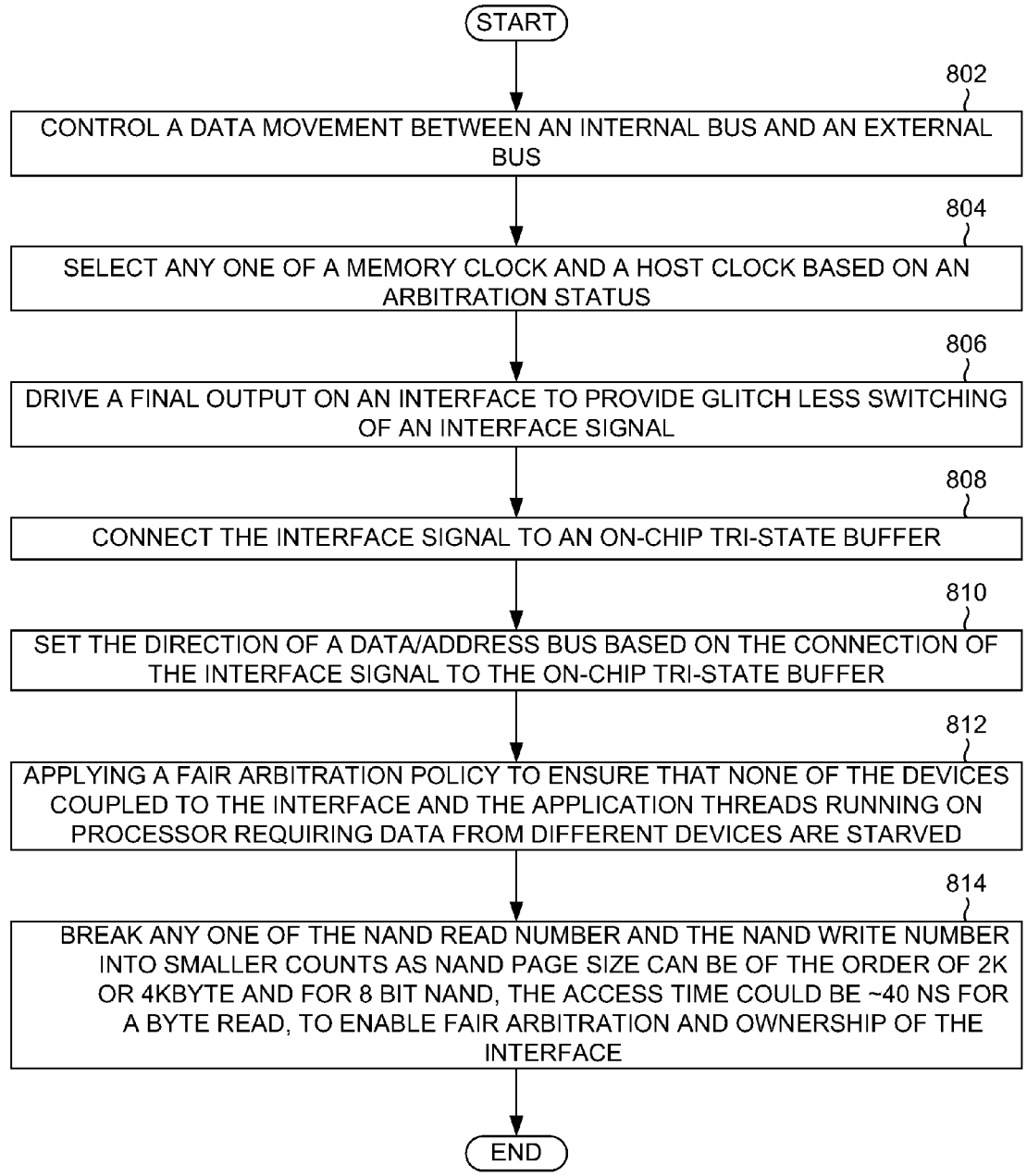
FIG. 8 is a process flow of controlling a set of multiplexers, according to one embodiment

FIG. 8 is a process flow of controlling a set of multiplexers (for e.g., NON-NAND MUX 404 and NAND MUX 406 of FIG. 4), according to one embodiment. In operation 802, a set of multiplexers (e.g., the set of multiplexers 414 of FIG. 4) may be controlled using an arbiter circuit (e.g., e.g., the arbiter circuit 402 of FIG. 4) per transaction (e.g., as illustrated in FIG. 4). In operation 804, a memory clock (e.g., the memory clock 424 of FIG. 4) and a host clock (e.g., the host clock 428 of FIG. 4) may be selected based on an arbitration status (e.g., using the clock selection module 426 of FIG. 4). In operation 806, a final output on an interface may drive to provide glitchless switching of an interface signal (e.g., the interface signal 422 of FIG. 4). In operation 808, the interface signal 422 may be connected to a set of tri-state buffer (e.g., the set of tri-state buffer 416 of FIG. 4). In operation 810, the direction of a data and address bus may set based on the connection of the interface signal to the tri-state buffer (e.g., using the direction set module 430 of FIG. 4). In operation 812, a fair arbitration policy may be applied to ensure that none of the devices coupled to the interface signal and application threads running on processor requiring data from different devices are starved.

The arbiter circuit 402 per transaction may provide direct access to a NOR device and a SRAM device from a System on a Chip (SoC) 104 (e.g., as illustrated in FIG. 1 and FIG. 2) and the arbiter circuit 402 per transaction may provide direct host accesses to a memory mapped region (e.g., the memory mapped region 418 of FIG. 4) of the SoC (e.g., as illustrated in FIG. 4).

The NAND device accesses may have indirect accesses because if bus ownership is to be given on a command boundary level, it would be unfair to other application threads requiring other external devices because an erase command, a page write command, a page read command, and/or other commands of the NAND device take large amounts of time. The arbitration may not be done at the command boundary of the NAND device, but at any intermediate phase of an address, a command, a read data, and/or a write data.

The indirect access to the NAND device may be through the SoC which writes in NAND controllers counter registers which in turn results in CLE and ALE signal toggling on a NAND interface, and in which a NAND WE signal may toggled along with write data as per a programmable write counter.

The indirect access to the NAND device may be through the SoC 104 which reads data from the NAND device as per a firmware that sets a read count and a read control in a control register, and in which a NAND RE# signal on a NAND interface may toggled as per a read counter setting thereby pulling data from the NAND device.

In operation 814, the NAND read number and the NAND write number may be broken into smaller counts when a NAND page size is larger than 2K per page for an 8 bit NAND to enable fair arbitration and ownership of the interface (e.g., such that an access time may be approximately 40 nanoseconds for a byte read).

A case of an external host accessing the SoC 104, an address/data may input and the SoC 104 accessing a NAND/NOR as the address/data are output, with an exception of NAND where address/data buses are multiplexed and in data phase, direction depends on a page read and a page write.

Figure 9:
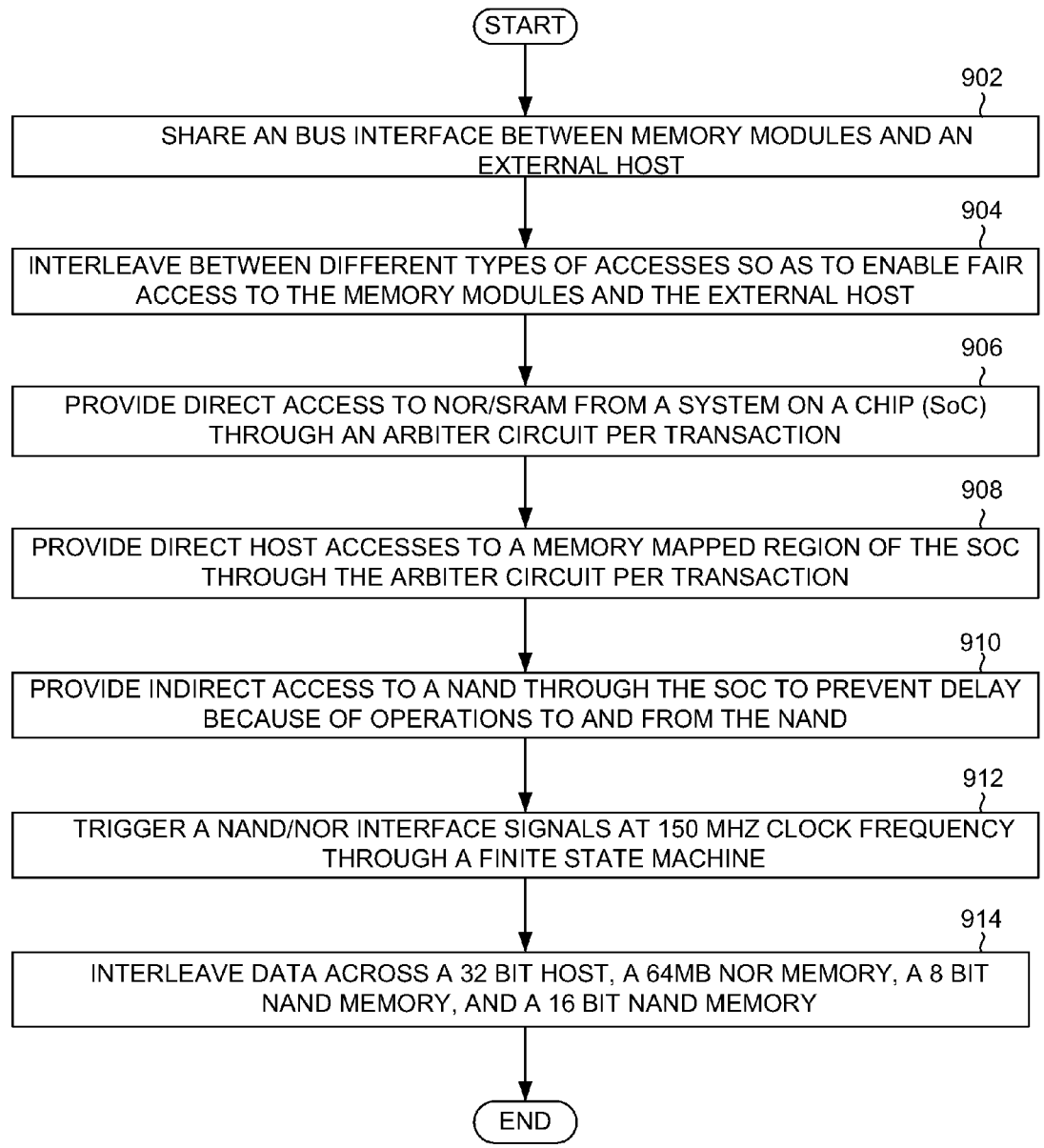
FIG. 9 is a process flow of sharing an bus interface between memory modules and an external host, according to one embodiment.

FIG. 9 is a process flow of sharing a bus interface between memory modules (e.g., NOR device 106, NAND device 108, and/or SRAM device 110) and an external host (e.g., the external host CPU 102 of FIG. 1 or FIG. 2), according to one embodiment. In operation 902, a bus interface (e.g., the bus interface 114 of FIG. 1) may be shared between a memory modules and an external host 102. In operation 904, different types of accesses may be interleaved so as to enable fair access to the memory modules and the external host 102. In operation 906, direct access may be provided to NOR/SRAM from a System on a Chip (SoC) 104 through an arbiter circuit 402 per transaction. In operation 908, direct host accesses may be provided to a memory mapped region (e.g., the memory mapped region 418 of FIG. 4) of the SoC 104 through the arbiter circuit (e.g., the arbiter circuit 402 of FIG. 4) per transaction.

In operation 910, indirect access may be provided to a NAND through the SoC 104 to prevent delay because of operations to and from the NAND. The memory modules and the external host may be asynchronous while others are synchronous. In operation 910, a NAND/NOR interface may trigger signals at 150 MHz clock frequency through a finite state machine. The bus may be a bi-directional bus. The modules and the external host may be used in both master and slave modes. The memory modules may include a NAND memory module, a NOR memory module, a synchronous SRAM memory module, and/or an asynchronous SRAM memory module. In operation 912, the data may be interleaved across a 32 bit host, a 64 MB NOR memory, an 8 bit NAND memory, and/or a 16 bit NAND memory.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the clock selection module 428, the direction set module 430 and/or other modules of FIGS. 1-9 may be enabled using the clock selection circuit, the direction set circuit, and/or other circuits using one or more of the technologies described herein.

In addition, it will be appreciated that the various operations, processes, and methods disclosed herein may be embodied in a machine-readable medium and/or a machine accesible medium compatible with data processing system (e.g., a computer system), and may be performed in any order.

The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:

1. A method, comprising:
controlling a set of multiplexers having a capability to multiplex data and an address from a System-on-a-Chip (SoC), a host device and a memory device through an arbiter circuit configured to perform arbitration per transaction, the host device being external to the SoC;
selecting one of a memory clock and a host clock based on a status of the arbitration, the host clock being associated with the host device and the memory clock being associated with communication between the SoC and the host device;
driving a final output on an interface associated with access of at least one of the SoC, the memory device and another SoC through the selected clock to provide glitchless switching of an interface signal coupled to a tri-state buffer; and setting a direction of a data and an address bus associated with the access through the tri-state buffer, wherein the arbitration is avoided at a command boundary of the memory device and done at an intermediate phase of an address, a command, a read data, and a write data associated therewith if a command time associated with the memory device exceeds a threshold.

2. The method of claim 1, further comprising applying a fair arbitration policy to ensure that none of the devices coupled to the interface signal and application threads running on a processor requiring data from different devices are starved.

3. The method of claim 1 wherein the memory device is one of a NAND device, a NOR device and a Static Random-Access Memory (SRAM) device.

4. The method of claim 3, further comprising providing, through the arbiter circuit, direct access to the NOR device and the SRAM device from the SoC and direct access to the host device to a memory mapped region of the SoC.

5. The method of claim 3, further providing an indirect access to the NAND device.

6. The method of claim 5, wherein the indirect access to the NAND device is through the SoC which writes in a NAND controller counter register, which, in turn, results in Command Latch Enable (CLE) and Address Latch Enable (ALE) signal toggling on a NAND interface, and in which a NAND Write Enable (WE) signal is toggled along with write data as per a programmable write counter.

7. The method of claim 5, wherein the indirect access to the NAND device is through the SoC which reads data from the NAND device as per a firmware that sets a read count and a read control in a control register, and in which a NAND Read Enable (RE#) signal on a NAND interface is toggled as per a read counter setting, thereby pulling data from the NAND device.

8. The method of claim 5, further comprising breaking at least one of a NAND read number and a NAND write number into smaller counts when a NAND page size is larger than 2K per page for an 8-bit NAND to enable fair arbitration and ownership of the interface.

9. The method of claim 3, wherein in a case of the host device accessing the SoC, an address/data is input and in a case of the SoC accessing one of a NAND device and the NOR device, the address/data is output, with an exception of the NAND device where address/data buses are multiplexed and in data phase, direction depends on at least one of a page read and a page write.

10. A method, comprising:
sharing a bus interface between a plurality of memory modules and an external host;
interleaving between different types of accesses so as to enable fair access to the plurality of memory modules and the external host;
providing direct access to a memory device from an SoC through an arbiter circuit per transaction if the memory device is one of a NOR device and an SRAM device;
providing direct host access to a memory mapped region of the SoC through the arbiter circuit per transaction; and
providing indirect access to the memory device through the SoC to prevent delay because of operations to and from the memory device if the memory device is a NAND device,
wherein the arbitration is avoided at a command boundary of the NAND device and done at an intermediate phase of an address, a command, a read data, and a write data associated therewith if a command time associated with the NAND device exceeds a threshold.

11. The method of claim 10, wherein at least some of the plurality of memory modules and the external host are asynchronous while others are synchronous.

12. The method of claim 10 further comprising triggering interface signals associated with at least one of the NAND device and the NOR device through a finite state machine.

13. The method of claim 10, wherein a shared bus is a bi-directional bus, and wherein the plurality of modules and the external host are used in both master and slave modes.

14. The method of claim 10, wherein the plurality of memory modules include at least one of the NAND device, the NOR device, a synchronous SRAM device, and an asynchronous SRAM memory device.

15. The method of claim 10, comprising interleaving data across at least one of 32 bit host, a 64 MB NOR memory, a 8 bit NAND memory, and a 16 bit NAND memory.

16. A system, comprising:
a set of memory modules including a NAND memory module and another memory modules;
a shared bus; and
an SoC to communicate with another module using the set of memory modules through the shared bus by applying a fair arbitration policy in which communication to and from the NAND memory module is prioritized differently than communication between the SoC and the another module using the another memory modules,
wherein, in accordance with the fair arbitration policy, the arbitration is avoided at a command boundary of the NAND memory module and done at an intermediate phase of an address, a command, a read data, and a write data associated therewith if a command time associated with the NAND memory module exceeds a threshold.

17. The system of claim 16, wherein at least one of a NAND read number and a NAND write number is broken into smaller counts when a NAND page size is on an order of between 2 kilobytes and 4 kilobytes per page, to enable fair arbitration and ownership of the shared bus.

18. The system of claim 16, wherein an indirect access to NAND is provided through the SoC which reads through a firmware that sets a read count and a read control, and in which a NAND read signal is toggled in every cycle, and wherein a NAND write signal is toggled along with a write data.

19. The system of claim 16, wherein at least some of the another memory modules are asynchronous while others are synchronous.

20. The system of claim 16, wherein an interface signal associated with at least one of the NAND memory module and a NOR memory module is triggered through a finite state machine, wherein the shared bus is a bi-directional bus, wherein the another module is at least one of another SoC and an external host, and wherein the SoC and the another module are used in both master and slave modes.

* * * * *